HEINRICH HILDEBRAND, HANS HILDEBRAND & FRITZ HILDEBRAND.
VAPOR ENGINE.
APPLICATION FILED JULY 14, 1910.
1,013,773.
Patented Jan. 2, 1912.
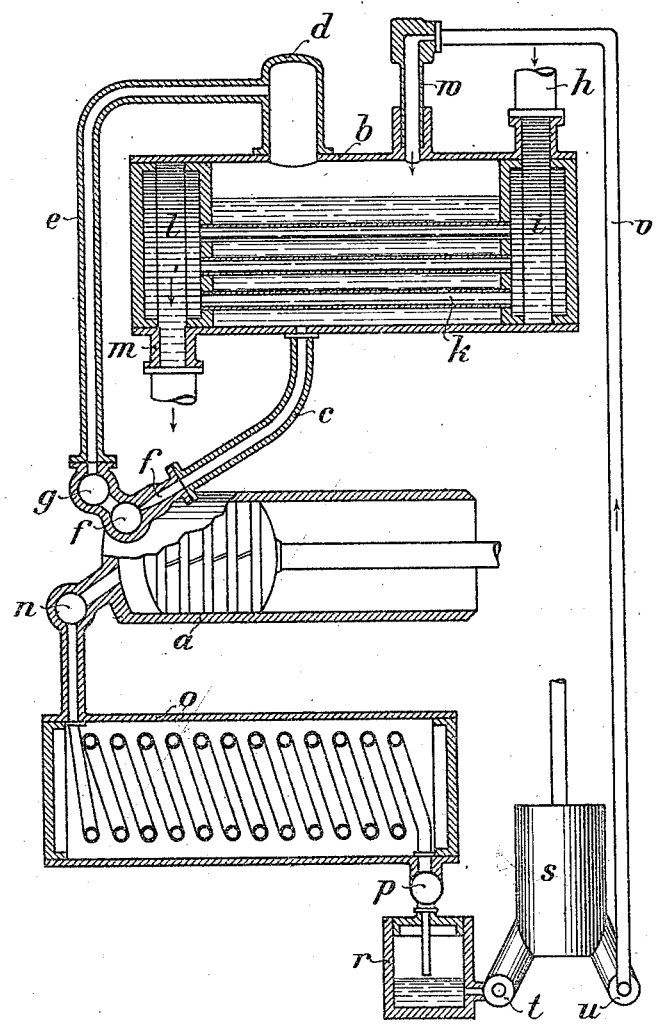

UNITED STATES PATENT OFFICE.

HEINRICH HILDEBRAND, HANS HILDEBRAND, AND FRITZ HILDEBRAND, OF BERLIN, GERMANY.

VAPOR-ENGINE.

1,013,773.  Specification of Letters Patent.  Patented Jan. 2, 1912.

Application filed July 14, 1910. Serial No. 571,920½.

*To all whom it may concern:*

Be it known that we, HEINRICH HILDEBRAND, HANS HILDEBRAND and FRITZ HILDEBRAND, all subjects of the German Emperor, and all residing at Wilmersdorf, Berlin, German Empire, have invented certain new and useful Improvements Relating to Vapor-Engines, of which the following is a specification.

Our invention relates to the driving of vapor engines with gases of low boiling points.

Carbonic acid engines have already been proposed in which there is employed as motive fluid liquid carbonic acid, or its vapor, mixed with compressed or heated atmospheric air. The hot air prevents freezing of the inner parts of the engine. In order, however, to be able to condense the motive fluid of the exhaust again, it is requisite to expel the contained atmospheric air, so that a special gas separating device must be combined with the apparatus for reliquefying the carbonic acid.

According to the present invention the provision of a gas separator is rendered redundant by mixture of the liquefied gas, or its vapor, with the compressed or heated absolute (*i. e.* gaseous) gas of the same agent; thus for instance liquid carbonic acid with heated absolute carbonic acid gas, liquid air with heated absolute air. The heating of the absolute gas (for example carbonic acid) can be effected by any desirable source of heat, such for instance as by compression in the engine itself. The engine may work in a two or a four stroke cycle.

In the accompanying drawing the figure is a vertical section and part elevation of one form of plant, with a four stroke cycle engine, according to the present invention.

The engine takes so much carbonic acid vapor from a heating vessel $b$ that it is converted by compression in the working-cylinder $a$ into absolute carbonic acid gas of high temperature. The extent of compression can be regulated through the quantity of vapor to be let in, and the heat of compression arising can be utilized to heat the liquid carbonic acid, admitted, for instance, at the point of maximum compression. The vaporous carbonic acid from the vessel $b$ flows through the dome $d$ and pipe $e$, while the liquid carbonic acid passes into the cylinder $a$ through the pipe $c$ and positively actuated nozzle-valve $f$. The likewise mechanically operated suction-valve $g$ regulates the supply of carbonic acid vapor to the cylinder. The vessel $b$ may, for example, be constructed in the manner of a multitubular steam boiler. Water at the natural temperature flows through the pipe $h$ into the fore-chamber $i$ and thence through the tubes $k$ into the end-chamber $l$ and leaves the vessel through the exit $m$ at a temperature which is considerably lower than that at which it entered the vessel, since its heat has been imparted to the liquid carbonic acid contained in the latter. Through the reduction of the pressure in the engine cylinder $a$, relatively to the pressure in the vessel $b$, and the heat of compression of the self-generated gas, the liquid carbonic acid evaporates and mingles with the hot absolute gases. The exhaust stroke drives the expanded motive agent through the valve $n$ into the condenser $o$, where by further expansion and cooling it returns into the liquid state, dropping through the reducing-valve $p$ into the collecting-chamber $r$. A feed pump $s$ draws the liquid through the valve $t$ and forces it through the valve $u$, pipe $v$, and a dome $w$ back into the vessel $b$ whereby the circuit is completed and the procedure can commence anew. If the temperatures are low, the absolute gas can be generated by adiabatic compression of the vapor of the liquefied gas. The vapor may either be sucked in, or flow in through its own pressure, or may be forced into the working cylinder by a compressor. An engine working with a two stroke cycle takes the absolute gas from a reservoir or a compressor; and the liquid entering the working cylinder of the engine mingles with it at the moment of reversal of the working piston in its backmost position. The exhaust period can, however, be so arranged that so much of the motive agent remains in the engine that it is converted into an absolute gas by compression by the piston, whereon it mingles with the liquid or the wet vapor thereof.

Having thus described our invention, we declare that what we claim as new and desire to secure by Letters Patent is—

1. The method of working a vapor engine by means of gases of low boiling points, consisting in mingling in the engine cylinder liquefied gas or its vapor, before expansion, with heated absolute gas of the same agent, substantially as described.

2. The method of working a vapor engine by means of gases of low boilindg points, consisting in mingling in the engine cylinder liquefied gas or its vapor, before expansion, with compressed absolute gas of the same agent, substantially as described.

3. The method of working a vapor engine by means of gases of low boiling points, consisting in mingling in the engine cylinder liquefied gas or its vapor, before expansion, with the absolute gas of the same agent, said absolute gas being generated by adiabatic compression of vapor of the liquefied gas, substantially as described.

In testimony whereof we affix our signatures in presence of two witnesses.

HEINRICH HILDEBRAND.
  HANS HILDEBRAND.
  FRITZ HILDEBRAND.

Witnesses:
 HENRY HASPER,
 WOLDEMAR HAUPT.